April 25, 1950   J. B. COSTELLO   2,505,099
APPARATUS FOR AND METHOD OF FORMING SURGICAL
TUBES AND OTHER TUBULAR ARTICLES
Filed Nov. 14, 1945
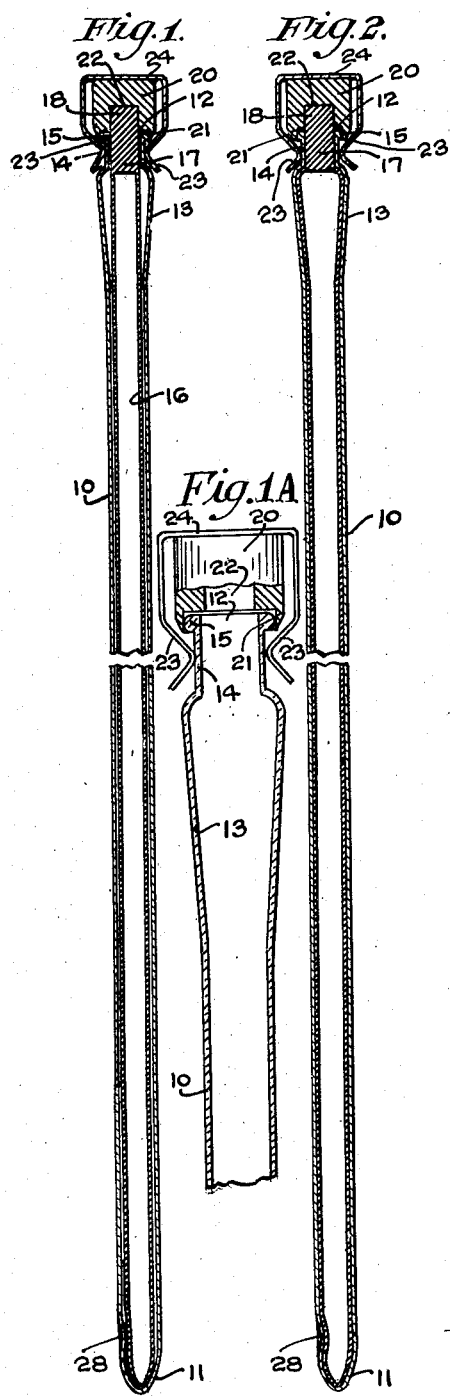
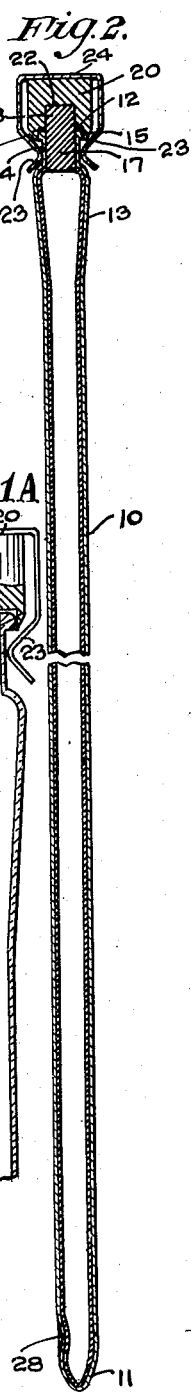
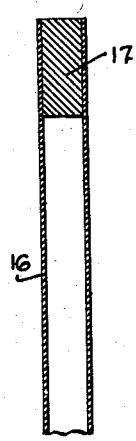
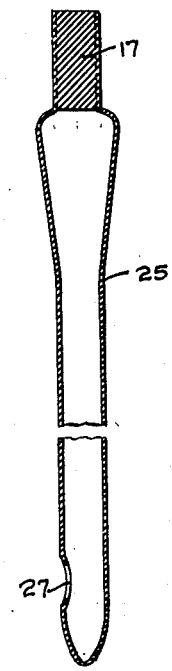
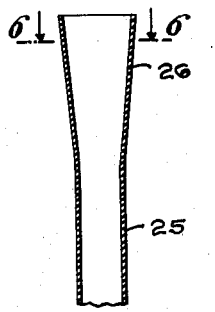
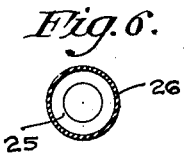
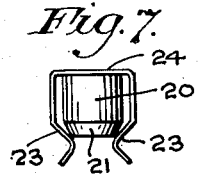
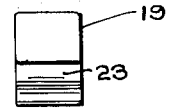
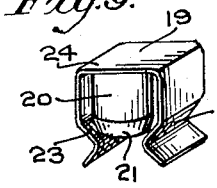
Inventor
JOHN B. COSTELLO
By Leo Edelson
Attorney Patented Apr. 25, 1950

2,505,099

UNITED STATES PATENT OFFICE 2,505,099

APPARATUS FOR AND METHOD OF FORMING SURGICAL TUBES AND OTHER TUBULAR ARTICLES

John B. Costello, Conshohocken, Pa., assignor to Lee Rubber & Tire Corporation, Conshohocken, Pa., a corporation of New York Application November 14, 1945, Serial No. 628,423

3 Claims. (Cl. 18—34)

1

This invention relates generally to the production of tubular rubber articles, especially catheters and surgical drains, and more particularly to an improved apparatus for and method of producing the same.

Heretofore and prior to this invention, it has been the practice, in accordance with one conventional method of procedure, to form such catheters and other tubular articles of uncured rubber tubing by inserting the same in an external mold, usually formed of glass, and then placing the mold-enclosed article in a vulcanizer for curing the rubber in its mold. In accordance with this conventional mode of procedure, the open end of the tubular article is extended outwardly of its mold for a length sufficient to permit it to be folded upon itself one or more times, the folded end of the uncured rubber tubing being then manually wrapped and tied to the free end of the mold so as to seal the interior of the uncured rubber tubing and at the same time secure it within its mold. Thereafter, when the mold with its encased tubing is subjected to vulcanizing temperature, the pressure of the heated air within the interior of the uncured tubing expands and sets the latter to the internal shape of the mold. In catheters and like articles, one end thereof is normally closed and in such case the mold is correspondingly closed at one end, thereby necessitating sealing of the rubber tubing only at one end thereof. However, in rubber tubing open at opposite ends, sealing of both of said ends is required preliminarily to subjecting it to the curing step.

The sealing of the open end or ends of the uncured rubber tubing by the folding and wrapping procedure just described is not only laborious and time-consuming, but also involves considerable waste of rubber compound and sometimes results in the production of defective goods, inasmuch as by such manually effected folding and wrapping procedure it is practically impossible to insure accurate disposition of the sealed end of the tubing centrally within the open end of the mold.

Accordingly, it is among the principal objects of the present invention to avoid the objections to and difficulties of the above described conventional procedure by the provision of an improved method of and means for sealing the normally open end of the uncured rubber tubing and accurately centering it within the open end of its mold preliminarily to curing of the tube.

A further object of the present invention is to provide a means for and method of forming

2 to accurate dimension rubber surgical tubes and the like, which dispense with the need for the laborious and time-consuming folding and wrapping operation characteristic of the old method, which involve a minimum waste of rubber compound, and which facilitate and render more economical the production of such tubes.

Other objects and advantages of the invention will appear more fully hereinafter, it being understood that the present invention consists substantially in the combination, construction, location and relative arrangement of parts, as well as in the method of employing the same, all as is described more fully hereinafter, as shown in the accompanying drawings, and as finally pointed out in the appended claims.

In the said accompanying drawings:

Figure 1 is a vertical sectional view of a completely assembled mold for a catheter with the uncured rubber tubing encased therein ready for the curing process;

Figure 1A is an enlarged vertical sectional view of the open end flared portion of the mold assembly;

Figure 2 is a vertical sectional view of the mold and its encased catheter body showing the latter expanded and set to shape after curing thereof;

Figure 3 is a sectional view showing the upper end of the uncured rubber tube sealed preliminarily to insertion within its curing mold;

Figure 4 is a sectional view showing the cured catheter removed from its mold;

Figure 5 is a sectional view of the upper portion of the completed catheter;

Figure 6 is a transverse sectional view taken on the line 6—6 of Figure 5;

Figure 7 is a front elevational view of the mold cap member;

Figure 8 is a side elevational view of said cap member; and

Figure 9 is a perspective view thereof.

Referring now to the drawings, it will be observed that the mold for the catheter to be formed in accordance with the principles of the present invention essentially consists of a glass tube 10 having a closed bottom end 11 and an open upper end 12, the upper portion of the glass mold being outwardly flared, as at 13, and terminating in a neck portion 14 having a beaded annular edge 15. The flared portion 13 of the mold produces a correspondingly flared or funnel-shaped portion in the completed catheter (see Figures 4 and 5), it being noted, however, that the neck portion 14 of the mold is of the same internal diameter as that of the cylindrical body portion of the mold. It will be understood, of course, that the flared portion 13 of the mold is not indispensable and that in lieu thereof some other shape may be employed, as by forming the mold of uniform diameter throughout its length.

The tube to be shaped and cured within the mold 10 is initially prepared in any suitable manner of uncured rubber compound, the uncured tube 16 being normally formed with a closed bottom end and an open upper end which, in accordance with the method of the present invention, is sealed by the insertion therein of a rubber plug 17, which may be formed of either cured or uncured solid rubber. Upon the insertion of this rubber plug 17, the interior of the uncured tube 16 is sealed, and in such sealed condition it is inserted in the glass mold 10, as shown in Figure 1, the length of the mold being such that the plugged end of the uncured tube which is embraced by the neck portion 14 of the mold, extends somewhat beyond the beaded end 15 of the mold, as at 18.

The cap member, designated generally by the reference numeral 19, is then snapped onto the end of the mold, as shown, to secure the uncured tube 16 against axial displacement from the mold and with its sealed end accurately centered within the neck portion 14 of the mold. As clearly appears in Figures 1, 1A, 2, 7, 8 and 9, this cap member 19 essentially consists of a cylindrical body member 20 having a depending annular flange 21 adapted to circumferentially embrace the beaded edge 15 of the glass mold. The body of the cap member 18 is provided with a central socket 22 for receiving the outwardly projecting portion 18 of the plugged end of the uncured tube, the depth of the socket 22 being such that when the cap member is attached to the neck end of the mold it secures the uncured rubber tube against any tendency for it to shift with respect to the mold due to the pressure generated internally of the tube during the curing process. In addition, the socket 22 of the cap member receives the projecting sealed end of the uncured tube and so secures said end accurately centered within the neck portion 14 of the tube.

The cap member 19 is quick-detachably, but firmly secured to the mold by a pair of oppositely disposed spring-pressed elements 23—23 which respectively engage the neck portion of the mold at diametrically opposite sides thereof in such manner that said elements coact with the beaded edge 15 to prevent axial displacement of the cap member from the mold. Preferably, the spring pressed elements 23—23 are formed of a single U-shaped member with its base 24 suitably secured, as by welding or otherwise, to the top surface of the cylindrical body of the cap member, it being understood, however, that other suitable means may be employed for detachably securing the cap member to the end of the mold.

The mold with the uncured sealed rubber tube disposed therein may then be placed in a vulcanizing oven at a temperature and for a time sufficient to cure the rubber within its mold, it being apparent that the pressure of the heated air within the sealed interior of the tube expands and sets the latter to the internal shape of the mold 10. It will be understood, of course, that instead of depending solely upon air entrapped within the sealed interior of the tube for expanding the latter to shape during the curing process, any other suitable fluid for this purpose may be introduced into the interior of the tube prior to sealing the end thereof by means of the plug 17 without in any way departing from the principles of the present invention.

Upon completion of the curing step, the cap member 19 is removed from the mold and the cured catheter body 25, as shown in Figure 4, may then be removed from the mold by pulling it lengthwise therefrom, this removal being readily effected by means of the projecting portion 18 of the cured tube. Thereupon, the upper end of the cured catheter body 25 is trimmed by cutting off the plugged end thereof to provide a finished upper end portion 26 of the flared shape shown in Figure 6, following which the eye 27 is formed in the side of the tube adjacent its closed end by the conventional cutting or drilling operation. In this connection, it will be noted that the catheter mold is provided in the wall thereof with a depression 28 by means of which a corresponding depression is formed in the wall of the cured catheter tube, which is cut out to form the eye 27 in the case of a hollow end type of catheter, or which is drilled through to form the said eye in the case of a solid end type of catheter.

It will be understood, of course, that the present invention is susceptible of various changes and modifications which may be made from time to time and, accordingly, it is intended to claim the same broadly as well as specifically as indicated in the appended claims.

What is claimed as new and useful is:

1. A method of forming open-ended surgical tubes and the like, which consists in initially sealing the interior of a pre-formed tube of uncured rubber by insertion of a solid plug in the open end thereof, in thereafter inserting said pre-formed tube lengthwise into a hollow mold element having a neck closely embracing the plugged end of the pre-formed tube with said plugged end of the tube centered in said mold neck and projecting externally thereof, in then capping said mold with a removable member detachably in engagement with said mold neck and in such embracing relation with respect to the externally projecting plugged end of the pre-formed tube as to maintain said plugged end accurately centered in the neck of the mold, and in subsequently curing the tube in the mold by heating the latter and so expanding the tube to a set shape in conformity with that of the mold.

2. A method of forming open-ended surgical tubes and the like, which consists in initially sealing the interior of a pre-formed tube of uncured rubber by insertion of a solid plug in the open end thereof, in thereafter inserting said pre-formed tube lengthwise into a hollow mold element having a neck closely embracing the plugged end of the pre-formed tube with said plugged end of the tube centered in said mold neck and projecting externally thereof, in then capping said mold with a removable member detachably in engagement with said mold neck and in such embracing relation with respect to the externally projecting plugged end of the pre-formed tube as to maintain said plugged end accurately centered in the neck of the mold, in subsequently curing the tube in the mold by heating the latter and so expanding the tube to a set shape in conformity with that of the mold, and in finally withdrawing said cured tube lengthwise from its confining mold by means of said externally projecting plugged end thereof.

3. In a mold for forming rubber surgical tubes and the like, in combination, an open-ended tubular curing mold adapted to receive therein a length of tubing to be cured with one end thereof projecting outwardly of the open end of the mold, a cap member detachably secured to said open end of the mold, said cap member being centrally recessed to accommodate said outwardly projecting end of the tubing in said mold and being further provided with an annular flange adapted to closely embrace the open end of the mold to axially aline said central recess of the cap member with the bore of said mold, and coacting means in said mold and cap member for detachably interlocking the same whereby the cap member serves additionally to prevent axial displacement of the tubing relatively to the mold during curing of the tubing in the mold, said coacting means comprising an annular beaded edge at the open end of the tubular mold and spring elements on said cap member engageable with the mold at diametrically opposed points thereof inwardly of its beaded edge.

JOHN B. COSTELLO.

REFERENCES CITED

The following references are of record in the file of this patent:

UNITED STATES PATENTS

| Number | Name | Date |
| --- | --- | --- |
| 672,909 | Lefferts | Apr. 30, 1901 |
| 684,253 | Houston | Oct. 8, 1901 |
| 763,550 | Field | June 28, 1904 |
| 823,924 | Clark | June 19, 1906 |
| 1,724,354 | Kraft | Aug. 13, 1929 |
| 1,740,144 | Barrett | Dec. 17, 1929 |
| 1,773,138 | Gammeter | Aug. 19, 1930 |
| 2,037,172 | Leffert | Apr. 14, 1936 |
| 2,248,898 | Ross et al. | July 8, 1941 |
| 2,350,640 | Rorke | June 6, 1944 |
| 2,374,233 | Pfleumer | Apr. 24, 1945 |

FOREIGN PATENTS

| Number | Country | Date |
| --- | --- | --- |
| 15,868 | Great Britain | Dec. 17, 1929 |